United States Patent
Büchler (12)

(10) Patent No.: US 6,169,716 B1
(45) Date of Patent: Jan. 2, 2001

(54) DATA SLICER FOR AN APPARATUS AND A METHOD FOR READING FROM AND/OR WRITING TO OPTICAL RECORDING MEDIA

(75) Inventor: Christian Büchler, Villingen-Schwenningen (DE)

(73) Assignee: Deutsche Thomson-Brandt GmbH, Villingen-Schwenningen (DE)

( * ) Notice: Under 35 U.S.C. 154(b), the term of this patent shall be extended for 0 days.

(21) Appl. No.: 09/045,446

(22) Filed: Mar. 20, 1998

(30) Foreign Application Priority Data

Apr. 12, 1997 (DE) .............................. 197 15 274

(51) Int. Cl.[7] ...................................... G11B 7/00
(52) U.S. Cl. ................. 369/59; 369/124.14; 369/124.08
(58) Field of Search ................... 369/54, 59, 58, 369/32, 48, 124.14, 124.15, 124.08

(56) References Cited

U.S. PATENT DOCUMENTS

| 5,204,848 | 4/1993 | Cardero et al. ............ 369/48 |
| 5,526,339 | 6/1996 | Shimada ................. 369/124 |
| 5,576,842 | 11/1996 | Choi ......................... 386/46 |
| 5,592,456 * | 1/1997 | Miyashita et al. ......... 369/59 |
| 5,598,392 * | 1/1997 | Izumi et al. ............... 369/59 |
| 5,717,672 * | 2/1998 | Furukawa et al. ........ 369/44.29 |
| 5,974,088 * | 10/1999 | Chang ....................... 369/59 |
| 5,982,724 * | 11/1999 | Hayashi et al. ........... 369/59 |
| 5,986,987 * | 11/1999 | Taguchi et al. ........... 369/59 |
| 5,995,465 * | 11/1999 | Hayashi et al. ........... 369/59 |

FOREIGN PATENT DOCUMENTS

| 0753850A1 | 1/1997 | (EP) . |
| 7-296514A | 11/1995 | (JP) . |
| 8-7490A | 1/1996 | (JP) . |

* cited by examiner

Primary Examiner—Nabil Hindi
(74) Attorney, Agent, or Firm—Joseph S. Tripoli; Paul P. Kiel

(57) ABSTRACT

The present invention relates to a device for reading from and/or writing to optical recording media which has a data slicer for generating a digital output signal from an analogue input signal, a comparison signal generating unit for providing a comparison signal to the data slicer, and a clock generator for generating a clock signal which is matched to the input signal and/or to the output signal. The device optimizes the function of the data slicer independently of the maximum run length in the analogue input signal. The device has a phase comparison device for comparing the digital output signal with the clock signal, which device is connected to an input of the comparison signal generating unit.

10 Claims, 3 Drawing Sheets

Figure 1:
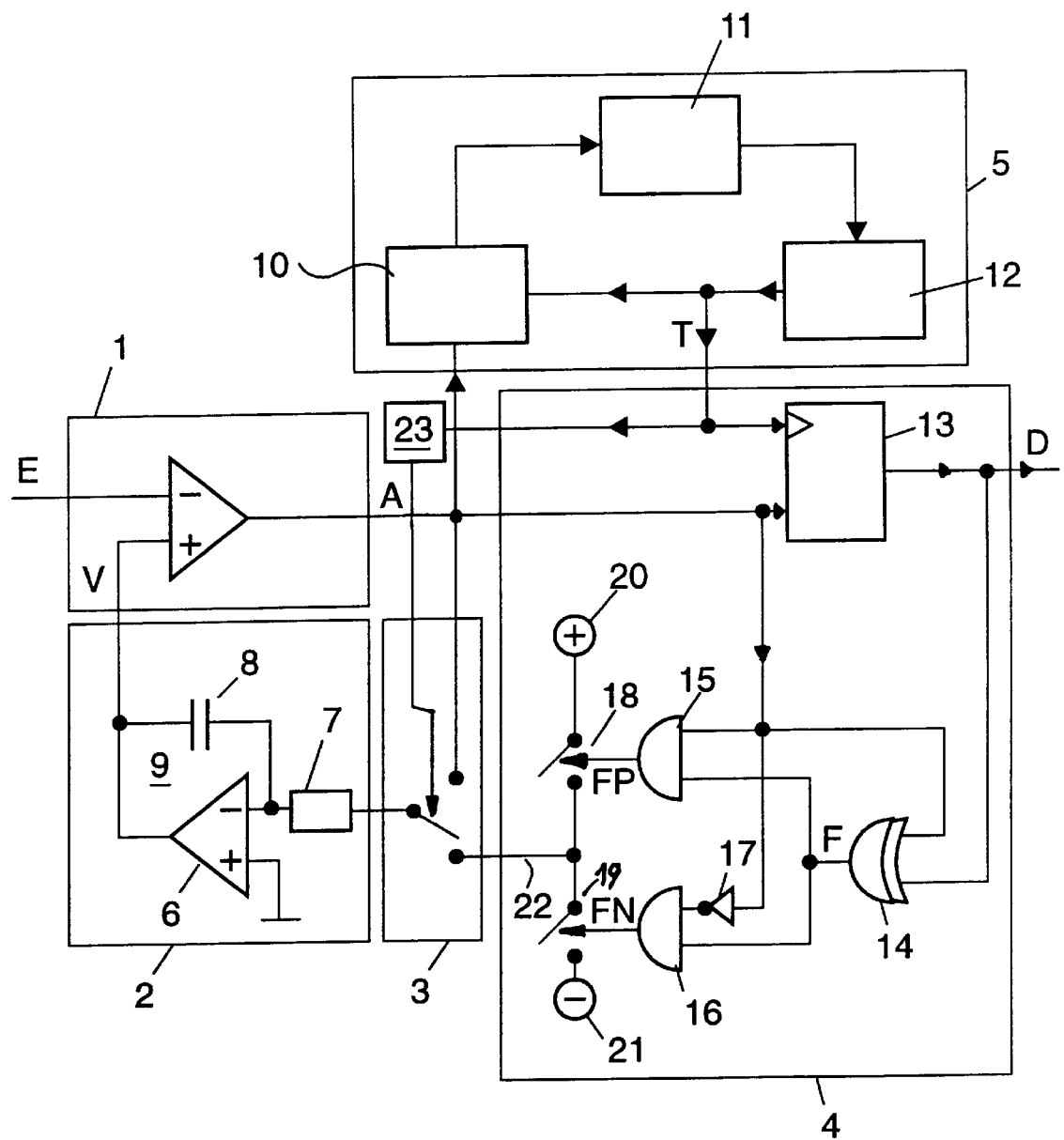

DATA SLICER FOR AN APPARATUS AND A METHOD FOR READING FROM AND/OR WRITING TO OPTICAL RECORDING MEDIA

The present invention relates to a device for reading from and/or writing to optical recording media which has a data slicer for generating a digital output signal from an analogue input signal.

A device of this type is disclosed for example in "The art of digital audio", J. Watkinson, Focal Press, ISBN 0-240-51270-7, in particular page 464. In this known device, the data slicer comprises a comparator, to one of whose inputs the analogue input signal is applied, to whose other input a comparison signal is applied and whose output signal is the digital output signal. The comparison signal is generated from the digital output signal by a comparison signal generating unit. For this purpose, the said output signal is fed to an integrator having a relatively long time constant. If the analogue input signal has, on average, a 50% distribution between positive and negative regions, that is to say the high and the low phases of the digital output signal are likewise represented equally often on average over time, then the comparison signal remains essentially constant. If, on the other hand, the analogue input signal has a shift in the positive or negative direction, a so-called DC voltage offset component, then the ratio of the high to the low components of the digital output signal deviates from 50%. The integrator increases or reduces the comparison signal until a corresponding 50% value is reached again. This known device may be regarded as having the disadvantage that relatively long desired deviations from a 50% distribution, that is to say a relatively long so-called maximum run length, likewise lead to a change in the comparison signal. This means that only a specific maximum duration of the high and of the low phases is possible if reliable and error-free functioning of the data slicer is to be achieved. Lengthening of this maximum period of time must be accompanied by an increased time constant of the integrator, in order not to provoke an excessively fast change in the comparison signal. The consequence of this is that the comparison signal is changed only relatively slowly, as a result of which actual interference, for example a DC voltage offset, caused for example by the reflectivity of the recording medium being changed on account of soiling, can no longer be followed rapidly enough by the data slicer. This would lead to errors in the digital output signal.

An object of the present invention is to develop a device wherein as far as possible optimum functioning of the data slicer is ensured at any time, independently of the maximum run length in the analogue input signal.

According to the invention, this object is achieved by means of the features noted below. According to the invention, the comparison signal is changed as a function of a temporal shift between the digital output signal and the clock signal. To that end, it is preferred to compare specific edges of the respective signals. This has the advantage that the value of the comparison signal is changed not as a direct function of the digital output signal but as a function of the comparison between digital output signal and clock signal. The two signals should have a constant shift with respect to one another when there is no DC voltage offset on the analogue input signal. In other words, edges of the analogue output signal should occur simultaneously with edges of the clock signal or with a constant shift with respect thereto, the analogue output signal generally having a much lower number of edges than the clock signal. Consequently, a device according to the invention enables greater run lengths in the analogue input signal without this having adverse effects on the digital output signal. Consequently, it is advantageously possible to use the device according to the invention also to read from and/or write to novel optical recording media which operate for example according to the DVD standard, that is to say which have greater run lengths of the channel data in comparison with previous recording media. In this case, the pulse generating device can compare for example the rising and falling edges of the digital output signal with one type of edges of the clock signal, that is to say rising or falling edges, in which case the time between the edge of the output signal and that of the clock signal should be the same both for rising and for falling edge of the output signal. In this case, it is ensured that the output signal is free from a DC voltage offset.

The pulse generating device preferably has controllable switching elements which connect the output thereof to a first or a second reference voltage for the duration of a difference between digital output signal and clock signal. In this case, the reference voltages are advantageously the positive and negative supply voltages, but any other suitable reference voltages can likewise be employed in a device according to the invention. This has the advantage that the comparison signal is changed only when the time durations of the difference between the phases of clock signal and output signal are not identical. In general, however, this time duration is significantly shorter than the positive or negative components or run lengths of the digital output signal, with the result that only a slight variation occurs particularly with long run lengths.

The pulse generating device is preferably designed as a phase comparison device, which carries out a phase comparison between analogue output signal and clock signal, similarly to the above-described comparison effected as a function of the edges, as a function of the analogue output signal. This has the advantage that even in the event of edges of the respective signals which optionally deviate to a great extent from the ideal shape, a phase comparison of these signals is nevertheless possible in a specific interval. Such an interval begins, for example, at a zero crossing of the analogue output signal and ends at the next positive zero crossing of the clock signal. Other, optionally longer, suitably selected intervals are also possible according to the invention.

According to the invention, the pulse generating device has a data output unit, which generates a synchronized data signal from the digital output signal and the clock signal. This has the advantage that relative shifts of the edges of the digital output signal in comparison with the clock signal are compensated for, which shifts may be caused for example by slight fluctuations, for example in the comparison signal. An even more uniform data signal is generated in this way.

The invention furthermore provides for the data signal and the digital output signal to be compared with one another. This has the advantage that the data signal, which likewise contains the clock information of the clock signal, can be used for comparison and, consequently, the data output unit is used doubly. Furthermore, a particularly low circuitry outlay for phase comparison can be attained in this way.

The comparison signal generating unit preferably has an integrator. This has the advantage that the input signal of the comparison signal generating unit is integrated and, consequently, relatively small fluctuations are averaged out. Nevertheless, a DC voltage offset possibly present in the input signal leads to a change in the comparison signal which lasts until the DC voltage offset has been compensated for.

The invention provides a switching device by means of which the digital output signal can be applied to the input of the comparison signal generating unit. This has the advantage of enabling a changeover from the pulse generating device to the output signal in the case of a signal of the pulse generating device which is unsuitable or affected by interference. Such an unsuitable signal may be present for example in the absence of a clock signal or in the event of a clock signal affected by severe interference. However, it is completely within the scope of the invention to perform such a changeover in the case of other circumstances being present, too, for example in dependence on the type of optical recording medium used, of the respectively used operating mode of the device or the like. In the simplest case, a switch which enables the connection to the digital output signal is provided as the switching device.

A method, according to the invention, for changing a value "comparison signal" is described below. In this case, the data slicer is initially operated with an original comparison signal which is a fixed starting value which should function as standard. In the further method steps, a first and a second time duration between edges of the output signal and a clock-signal edge are determined and the value of the comparison signal is changed given the presence of a difference between these time durations. This has the advantage that the input signal does not have to be free of a DC voltage offset, rather that the value of the comparison signal is correspondingly adapted. The time length of the high and low components can in this case be relatively long without the value of the comparison signal being changed, as long as no time difference occurs.

The invention furthermore provides for the method steps to be repeated a number of times until a time difference no longer exits. This has the advantage that the changing and setting of the value do not take place rapidly, that is to say in a single pass, but rather after repetition a number of times, with a higher degree of accuracy.

A further advantageous refinement of the method according to the invention consists in repeating the method steps at predetermined time intervals, for example every five seconds, and/or in dependence on suitable criteria, for example the error rate of the synchronized data signal. This has the advantage that the value is not set just once, but rather is changed in a manner adapted to the conditions of the device or external influences, this even being done continuously, if appropriate.

The invention furthermore provides for the clock signal to be checked for errors and, given the presence of errors in the clock signal, for the comparison signal to be set to a predetermined value. This has the advantage that a deterioration in the comparison signal, which might occur in the event of a missing or errored clock signal, is precluded from the outset. The predetermined value of the comparison signal is, for example, the original value of the comparison signal, the last valid value of the comparison signal, a value determined for clock signal errors, or a value suitably determined in another way, for example a value determined by way of integration of the digital output signal.

Figure 2:
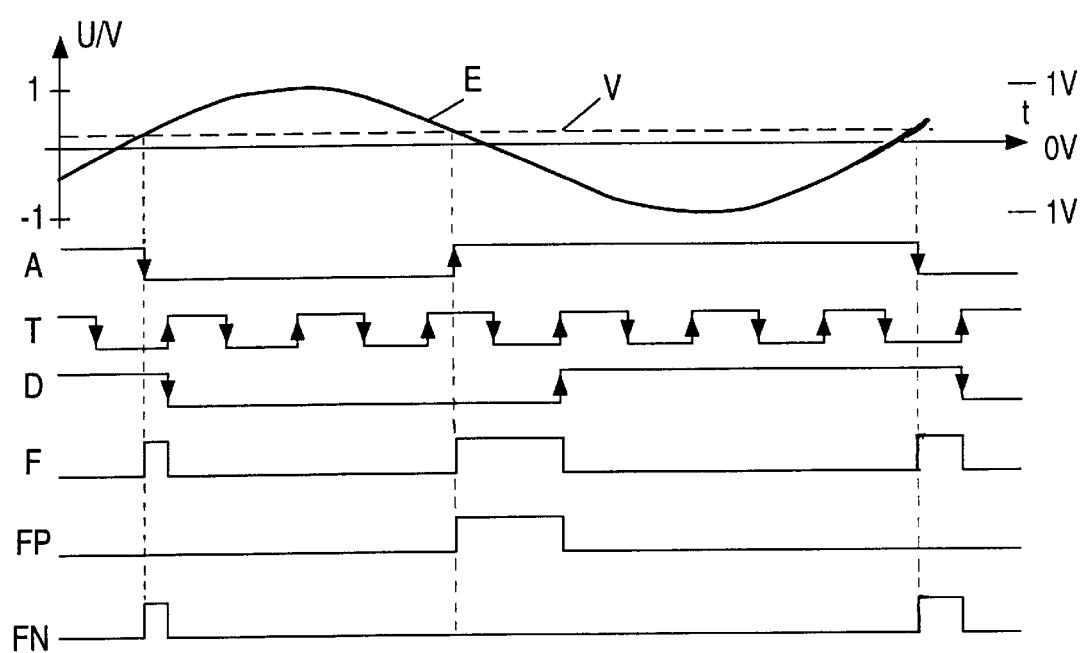
Figure 3:
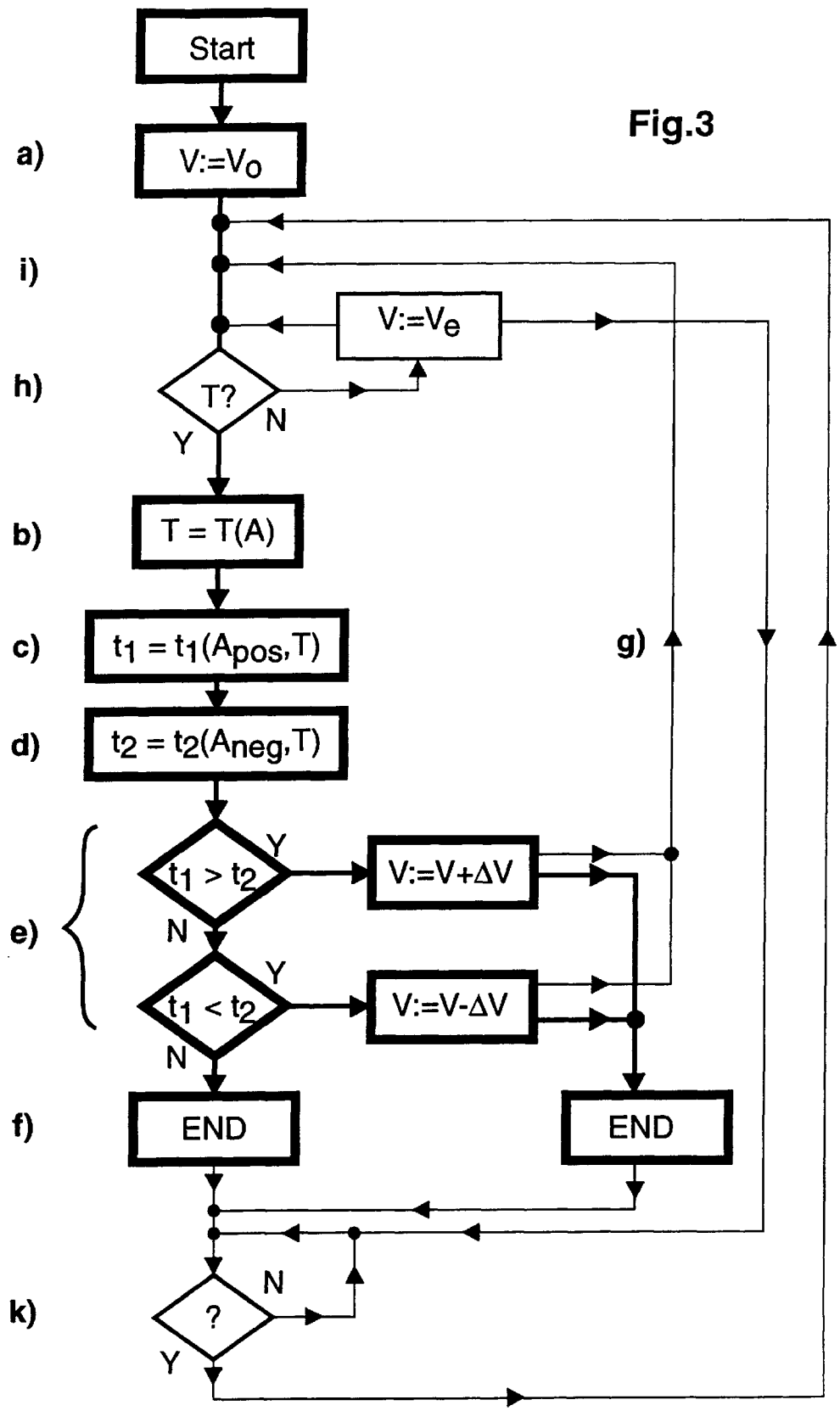

Further advantages of the present invention emerge from the following description and the figures. It goes without saying here that the invention is not restricted to the exemplary embodiments described. In the figures:

FIG. 1 shows a schematic illustration of an exemplary embodiment of a device according to the invention, FIG. 2 shows diagrams of selected signals for an input signal affected by an offset, and FIG. 3 shows a flow diagram of a method according to the invention.

A detail of a device according to the invention is evident, in a schematic illustration, in FIG. 1. The analogue input signal E and the comparison signal V are applied as input signals to the data slicer 1. The comparison signal V is generated in the comparison signal generating unit 2, whose input can be connected via the switching device 3 to the output of the pulse generating device 4 or to the output of the data slicer 1. The digital output signal A is present at the output of the data slicer 1. The digital output signal A is applied to the input of the clock generator 5, whose output signal is the clock signal T. The digital output signal A and the clock signal T are applied to the inputs of the pulse generating device 4. The synchronized data signal D is present at a first output of the pulse generating device 4; a second output 22 of the pulse generating device 4 can be connected via the switching device 3 to the input of the comparison signal generating unit 2.

In the exemplary embodiment, the input signal of the comparison signal generating unit 2 is integrated by means of an integrator 9, which is formed from an operational amplifier 6, a resistor 7 and a capacitor 8. To that end, according to the solution known from the prior art, the digital output signal A is continually applied to the input of the comparison signal generating unit 2, whereas the invention provides for this input to be connected to the output of the pulse generating device 4.

The clock generator 5 has a phase comparator 10, which compares the phase angle of digital output signal A and clock signal T. Its output signal, which corresponds to the phase error, is fed to a filter 11. The output signal thereof is a tuning voltage for the voltage-controlled oscillator 12 which generates the clock signal T.

The pulse generating device 4 has a data output unit 13, which is designed as a digital flip-flop in the exemplary embodiment. The clock signal T is applied to its clock input and the digital output signal A is applied to its other input. The output signal of the data output unit 13 is the synchronized data signal D, whose rising and/or falling edges are synchronized with the clock signal T. Both the data signal D and the digital output signal A are applied to the inputs of an EXCLUSIVE-OR gate 14. The output signal thereof, which is referred to below as the edge signal F, is at high level when the levels of data signal D and output signal A differ. The edge signal F is applied to a respective input of a first AND gate 15 and of a second AND gate 16. The output signal A is applied to the other input of the first AND gate 15, and the output signal A which has been inverted by an invertor 17 is applied to the other input of the second AND gate 16. The output signal of the first AND gate 15 is at high level whenever a positive edge of the output signal A has occurred, but the latter has still not been followed by a positive edge of the synchronized data signal D or of the clock signal T. It is therefore referred to below as the positive edge signal FP. The output signal of the second AND gate 16 is at high level whenever a negative edge of the output signal A has occurred, but the latter has still not been followed by a positive edge of the synchronized data signal D or of the clock signal T. It is therefore referred to below as the negative edge signal FN. The outputs of the first AND gate 15 and the second AND gate 16 are connected to controllable switching elements 18, 19, which, given a high level of the positive edge signal FP or of the negative edge signal FN, connect a first or second reference voltage 20 or 21 to the output 22 of the pulse generating device 4.

The switching device 3 can be controlled by a control unit 23. In the exemplary embodiment, provision is made for the control unit 23 to check the clock signal T, for example for presence and/or constant frequency. If the clock signal T is correct in accordance with this check, then the switching device 3 remains in the switch position illustrated in FIG. 1. It is brought to the second switch position when the clock signal T is not present or is present only with poor quality. According to another configuration, the switching device 3 is in the not-illustrated position after the device according to the invention is switched on. In accordance with this configuration, the control unit 23 effects a changeover of the switching device 3 after a certain predetermined time. A constant, steady-state clock signal T can generally be expected after this time, with the result that a more accurate clock signal V can be provided, with the aid of the pulse generating device 4, starting at the latest from this point in time.

FIG. 2 illustrates signal diagrams of the signals occurring in the exemplary embodiment illustrated in FIG. 1. In the top diagram, the analogue input signal E and the likewise analogue comparison signal V are plotted against time t. The voltage values +/−1 volt specified in the exemplary embodiment are specified only by way of example. The signals represented underneath refer to digital signals having either a high or a low level. From the point of view of time, they are represented in a manner corresponding to the time scale t specified in the top diagram. The upper digital signal represents the digital output signal A; illustrated underneath that is the clock signal T and underneath that the synchronized data signal D, followed in the downwards direction by the edge signal F and the positive edge signal FP and the negative edge signal FN.

It is evident that the comparison signal V does not correspond to the imaginary zero line of the analogue input signal E. In the figure illustrated, this imaginary zero line corresponds approximately to the value zero of the y axis (voltage 0 volts). The output signal A of the data slicer 1 changes its level at each of the points of intersection between the curves of analogue input signal E and comparison signal V. Due to the offset of the comparison signal V, the time durations of the low and high levels of the digitized output signal A have different lengths, even though the analogue input signal E lies in the positive and negative regions for approximately the same length of time.

The data output unit 13 designed as a digital flip-flop sets its output, upon the rising edge of the clock signal T, to the value present at its input. This produces the synchronized data signal D, whose high- and low-level regions thus once again correspond temporally in the example illustrated. An edge signal F occurs whenever the output signal A and the data signal D assume different levels. The edge signal F is formed in the EXCLUSIVE-OR gate 14. By comparison with the output signal A and the inverted output signal A, the positive edge signal FP and the negative edge signal FN, respectively, are formed in the AND gates 15 and 16, respectively. It is evident that in the example specified, the time length of the positive channel edges is greater than the time length of the negative channel edges. The input of the integrator 9 is thus connected for a longer period of time to the positive, first reference voltage 20 than to the negative reference voltage 21, with the result that the comparison signal V drops until the lengths of the positive and negative channel edges P and FN have become the same as a result of the dropping of the comparison signal V. Owing to the integrator 9 in the control loop, the value of the comparison signal V is adapted until symmetry of the sliced channel data, that is to say of the digital output signal A, is achieved. The present invention thus relates to a device for reading from digitally recorded media such as optical disks, tapes, etc., in which a so-called data slicer 1 is required as a linking element between the channel amplifier, that is to say the amplifier of the analogue input signal E originating from the optical scanner, from the read-head amplifier and so on, and the channel decoder. The task of the data slicer 1 is to cleanly reconstruct the data signal originating from the medium, from the optical recording medium in the exemplary embodiment, as far as possible independently of amplitude fluctuations, DC voltage superpositions and dips, to bring it to a logic level (TTL level) and make it available for further processing, that is to say for clock recovery, for channel decoding and so on.

To that end, it is usual to perform area integration of the output voltage downstream of the data slicer 1 and feedback of the integrated signal as comparison signal V. In other words, the comparison signal V at the input of the data slicer 1 is adjusted until the positive and negative areas of the output signal A have the same magnitude. This functions well, however, only when the analogue input signal E to be sliced is free from DC voltage, that is to say the same number of low and high states occur on average over time, that is to say the same number of run lengths are 0 or 1. Furthermore, according to the prior art, it is necessary to ensure that the maximum run length of the channel code, that is to say the maximum temporal extent of an uninterrupted high- or low-level region, does not exceed a specific length since otherwise the comparison signal V rises or falls to an excessive degree. The invention achieves setting of an optimum comparison signal V independently of freedom from DC voltage or run length of the channel code. For this purpose, a clock signal T is used which is recovered from the channel code and, as a general rule, is generated in any case since it is required in any case for further processing, for example in order to clock a channel decoder. Advantages of the solution according to the invention are that by virtue of integration in the control loop, the comparison signal V is altered until identical time intervals of positive and negative channel edges, that is to say positive edge signal FP and negative edge signal FN, with regard to the resynchronized channel clock signal, that is to say the clock signal T, are achieved. Drifting, that is to say severe rising or severe falling of the comparison signal V, is automatically prevented if no positive or no negative edge signal FP or EN is present, for example if the analogue input signal and, consequently, the digital output signal A completely fail to appear for a period of time, for example on account of a scratch on the optical recording medium. A further advantage of the solution according to the invention is that the comparison signal V is independent of the phase angle of the clock signal T with respect to the edges of the output signal A. Furthermore, the mark-space ratio of the digital output signal A is permitted to deviate, within limits, from 50%. As a result of the integration of the timing error of the positive or negative edge signal with respect to the resynchronized clock signal T instead of area integration of the digital output signal A, no error occurs in the comparison signal V when the input signal E is not free of a DC voltage offset. By means of the switching device 3 and the control unit 23, it is easily possible to switch back to the conventional method given the absence of a valid clock signal T.

FIG. 3 illustrates a method according to the invention in the form of a flow diagram. In this case, the sub-steps which are represented by lines having a lesser degree of boldness constitute advantageous developments of the actual method, the method steps of which are illustrated by lines having a greater degree of boldness.

After the start of the method for changing a value "comparison signal" V of a data slicer 1, the latter, in accordance with method step a), is initially operated with an original comparison signal $V_0$. In method step b), a clock signal T=T(A) is generated from the output signal A of the data slicer 1. In the next method step c), a first time duration t, between a positive edge $A_{pos}$ of the output signal A and an edge of the clock signal T is determined: $t_1=t_1(A_{pos}, T)$. In the next step d), a second time duration $t_2$ between a negative edge $A_{neg}$ of the output signal A and an edge of the clock signal T is determined: $t_2=t_2(A_{neg}, T)$. In the next method step e), the value of the comparison signal V is increased or reduced by a magnitude $\Delta V$ if a difference between the first and second time durations $t_1$, $t_2$ exists: $V_{new}=V_{old}+\Delta V$ or $V_{new}=V_{old}-\Delta V$. In this case, $\Delta V$ may be a fixedly redetermined value. $\Delta V$ is advantageously determined as a function of the difference: $\Delta V=\Delta V (t_1-t_2)$. In accordance with method step f), the data slicer 1 is operated with the new, changed value $V_{new}$ of the comparison signal V or, if no difference between the first and second time durations $t_1$, $t_2$ has occurred, with the unchanged value $V_{old}$.

An advantageous development of the method consists, according to method step g) in the case where a time difference $(t_1-t_2) \neq 0$ is present, in repeating method steps b) to e) until a time difference no longer occurs. This additional method step is illustrated by lines having a lesser degree of boldness. It is understood that a time difference which is shorter than a specific limit value is regarded as a time difference of zero.

A further advantageous development of the method described consists in the fact that in method step k), predetermined criteria are checked and, if appropriate, a renewed cycle of the aforementioned method steps b) to f) or b) to g) ensues. As a criterion of this type, provision is made for checking whether a specific, predetermined time has elapsed since the last cycle of method steps b) to f), and for providing a renewed cycle once this time has been exceeded. Another suitable criterion consists in initiating a renewed cycle of the abovementioned method steps as a result of optionally varying boundary conditions, such as a changed reflectivity of the recording medium, temperature changes that have occurred or the like.

It is furthermore provided to check the clock signal T for errors in method step h), and, given the presence of errors, to set the comparison signal V to a predetermined value $V_e$ in method step i). This value $V_e$ is advantageously the last valid value of the comparison signal V. Depending on the conditions of the device, it may be more advantageous, given the presence of errors in the clock signal T, to set the comparison signal V to a different predetermined value $V_e$, which may be determined for example as a function of the error rate, of the duration of the presence of errors, or of characteristic error properties. A likewise advantageous possibility for predetermining the value $V_e$ consists in using the conventional value, that is to say the value which is available by changing over the switching device 3. After the comparison signal V has been set to the predetermined value $V_e$, provision is made for once again checking the clock signal T for errors and for running in a closed loop until no more errors are present in the clock signal T.

Another possibility, not represented here, consists in branching to method step k) either immediately or after a specific number of cycled method steps h) and i). It is understood that after method step g) described above, either method step b) directly or, advantageously, first of all method step h) is executed in order to minimize the influence of errors in the clock signal on the comparison signal V. Other suitable modifications of the method described are also possible in accordance with the invention.

What is claimed is:

1. A device for reading from or writing to optical recording media comprising a data slicer for generating a digital output signal from an analogue input signal, a comparison signal generating unit for providing a comparison signal to the data slicer, a clock generator for generating a clock signal which is matched to the input signal or to the output signal, and a pulse generating device for comparing the digital output signal with the clock signal, the comparison signal generating unit comprising an integrator having an input connected to an output of the pulse generating device and an output connected to a comparison signal input of the data slicer.

2. The device according to claim 1, wherein the pulse generating device has controllable switching elements, which connect the output of the pulse generating device to a first or a second reference voltage, beginning with an edge of the digital output signal and ending with a predetermined edge of the clock signal, as a function of the edge of the output signal.

3. The device according to claim 1, wherein the pulse generating device is a phase comparison device having controllable switching elements, which connect the output of the phase comparison device to a first or a second reference voltage, for the duration of a phase difference between digital output signal and clock signal, as a function of the edge of the output signal.

4. The device according to claim 1, wherein the pulse generating device has a data output unit for generating a synchronized data signal from the digital output signal and the clock signal.

5. The device according to claim 4, wherein the data signal and the digital output signal are applied to the inputs of an EXCLUSIVE-OR gate, whose output is connected to a respective input of two AND gates, to whose respective other input the digital output signal and the inverted digital output signal, respectively, are applied, and whose outputs are connected to the controllable switching elements.

6. The device according to claim 1, wherein a switching device is provided, by means of which the digital output signal can be applied to the input of the comparison signal generating device.

7. A method for changing a value of a comparison signal of a data slicer of a device for reading from or writing to optical recording media, comprising the steps of:
   a) operating the data slicer with an original comparison signal;
   b) generating a clock signal from the output signal of the data slicer;

c) determining a first time duration between a positive edge of the output signal and an edge of the clock signal;

d) determining a second time duration between a negative edge of the output signal and an edge of the clock signal;

e) if a difference between the first time duration and the second time duration exists, changing the value of the comparison signal in response to the difference; and f) operating the data slicer with the changed value of the comparison signal.

8. The method according to claim 7, further comprising the step:

g) repeating steps b) to f) until there is no longer a difference between the first time duration and the second time duration.

9. The method according to claim 7, wherein method steps b) to f) or b) to g) are repeated at one of predetermined intervals and in dependence on suitable criteria.

10. The method according to claim 7, further comprising the steps:

h) checking the clock signal for errors; and i) setting the comparison signal to a predetermined value given the presence of errors in the clock signal.

* * * * *